United States Patent [19]

Amir

[11] Patent Number: 4,895,437
[45] Date of Patent: Jan. 23, 1990

[54] ILLUMINATION METHOD AND APPARATUS

[75] Inventor: Israel Amir, Ewing, N.J.

[73] Assignee: American Telephone and Telegraph Company, AT&T Bell Laboratories, Murray Hill, N.J.

[21] Appl. No.: 316,003

[22] Filed: Feb. 27, 1989

[51] Int. Cl.⁴ .......................... G02B 5/08; F21V 7/00
[52] U.S. Cl. .................................... 350/612; 362/297; 362/346
[58] Field of Search ................ 350/612; 362/391, 396, 362/296, 297

[56] References Cited

U.S. PATENT DOCUMENTS 4,798,448  1/1989  Van Raulte .......................... 362/346

Primary Examiner—Bruce Y. Arnold
Assistant Examiner—J. P. Ryan
Attorney, Agent, or Firm—Robert B. Levy

[57] ABSTRACT

Homogeneous illumination of a strip of area (12) on a surface (13) of a substrate (10) is achieved by directing light at a plurality of first light-reflective members (22) arranged above the substrate in spaced relationship parallel to the longitudinal axis (17) of the strip. Each ligh-reflective member (22), which takes the form of a three-sided prism reflector, splits the light incident thereon into two beams (40) which are each reflected by the reflector in an opposite direction downwardly at the strip so as to strike it at a grazing angle. Light is also directed at a second light-reflective body (30) which takes the form of a metal bar spaced above the substrate parallel to the longitudinal axis (17). The bar has a light-reflective surface (32) which serves to reflect the light directed thereat towards the strip (12) at an inclined angle in a direction generally perpendicular to the beams (40) reflected by the first light-reflective members (22).

7 Claims, 2 Drawing Sheets

ILLUMINATION METHOD AND APPARATUS

TECHNICAL FIELD

This invention relates to a method and apparatus for illuminating a substrate, such as circuit board, with light directed at the surface of the board at a grazing (i.e., acute) angle.

BACKGROUND OF THE INVENTION

As present day electronic components become smaller, the density (number) of components on circuit boards has generally increased. The increased density of components makes manual inspection of circuit boards to detect missing and misplaced components extremely difficult. For this reason, many electronics manufacturers are turning to machine vision systems to accomplish the task of circuit board inspection.

Allowed U.S. patent application, Ser. No. 111,954, now U.S. Pat. No. 4,811,410, filed in the name of I. Amir et al. on Oct. 23, 1987, and assigned to AT&T (incorporated by reference herein), discloses a system for inspecting a circuit board to detect missing and misaligned components. The Amir et al. inspection apparatus incorporates a linescan camera which contains a plurality of charge coupled devices (ccd's), each serving to capture the image of a small area or picture element (pixel). The ccd's in the linescan camera are arranged in a $1 \times N$ (N being the number of ccd's) linear array such that the ccd's collectively capture the image of a thin strip of surface area running across the circuit board undergoing inspection.

The ability of the linescan camera to capture the image of a long, but narrow, strip of surface area affords the camera the advantage of a wide field of view, as compared to other types of television cameras. With its wide field of view, the linescan camera can capture the image of a circuit board in a single pass. In contrast, with a conventional television camera, the field of view usually must be restricted to a very small area on the circuit board in order to obtain sufficient resolution for high inspection accuracy. Hence, it is usually necessary to "step" or displace such conventional cameras across the x and y axis of the circuit board in order for the camera to capture the entire image of the board.

One of the difficult tasks in implementing an inspection system using a linescan vision camera is to provide homogeneous illumination. In particular, achieving homogeneous side lighting of the circuit board, where light is directed at the surface at a grazing angle, in order to inspect for certain types of components, has heretofore proven to be very difficult. Simply directing light towards the board from each of its sides at a grazing angle usually does not provide sufficient intensity for good image resolution by the camera along its optical axis. The intensity of the light decreases proportionally to the square of the distance from the light source, so the light radiated from the edges of the circuit board will usually suffer too great a loss in intensity before reaching the center of the board.

Therefore, there is a need for a technique for homogeneously illuminating a substrate with side light.

SUMMARY OF THE INVENTION

Briefly, in accordance with the invention, homogeneous side lighting of at least part of the surface of a substrate is achieved by directing light at each of a plurality of first light reflectors arranged in spaced relationship above the substrate along a first axis. The light striking each reflector is split into two beams, each reflected onto the substrate at a grazing (i.e., acute) angle in a direction opposite to the other beam along the first axis. At the same time, light is directed at a second light reflector spaced above the substrate and aligned parallel to the first axis. The light directed at the second reflector is reflected towards the substrate, in a direction perpendicular to first axis, to strike the surface at a grazing angle. The beams reflected from each of the first light reflectors, and from the second light reflector, homogeneously illuminate a thin strip of surface area on the substrate with side light.

DETAILED DESCRIPTION

Figure 1:
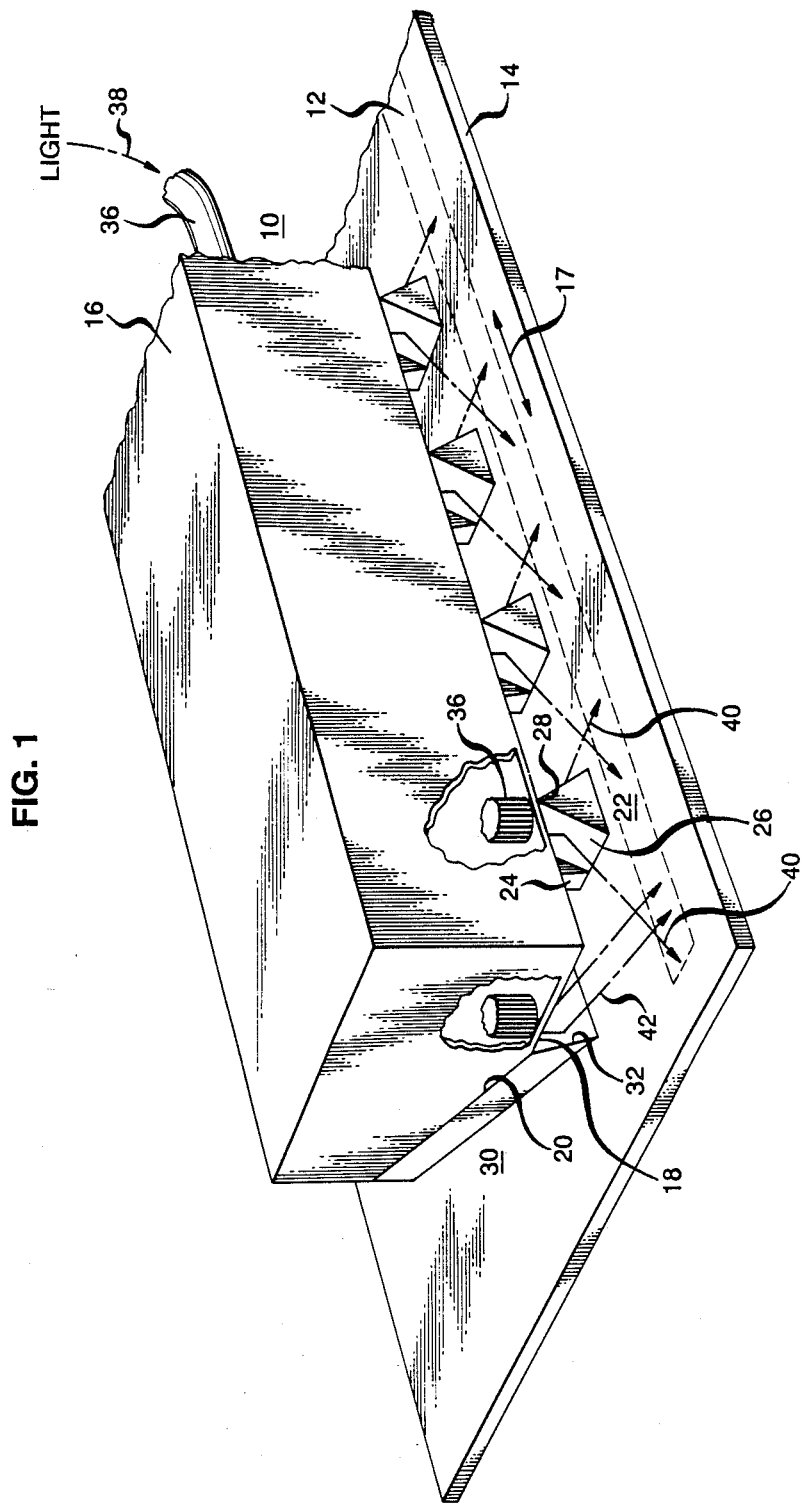
FIG. 1 is a perspective view of a light source in accordance with the teachings of the present invention.

FIG. 1 is a perspective view of a light source 10, in accordance with the invention, for homogeneously illuminating at least a thin strip of area 12 on a major surface 13 of a substrate 14 (e.g., a circuit board), with "side" light. Side light is defined as light directed at the surface 13 at an acute or "grazing" angle relative to the plane of the surface.

The light source 10 comprises a prismatic body 16 which is supported by a bracket (not shown) in spaced relationship above the substrate 14, and to one side of the strip 12 so as to be parallel to a first axis 17, which defines the longitudinal axis of the strip. On the bottom of the body 16 there is a first, flat surface 18 which runs along the body parallel to the axis 17. The bottom of the body also has a surface 20 which slopes downwardly, from left to right as seen in FIG. 1, towards the flat surface 18.

Each of a plurality of light-reflecting members 22 is mounted by an integral bracket 24 to the bottom surface 18 of the body 16 so the members lie in spaced relationship along a path parallel to the axis 17. The light-reflecting members 22 each take the form of a metal prism, made from brass plated with chrome nickel, and having three polished, light-reflective sides 26, one of which (the bottom one) being directly opposite to, and parallel with, the surface 13. Each of the other two sides 26 of each light-reflective member 22 slopes downwardly from a vertex 28 which lies just below the bottom surface 18. The two downwardly sloping sides 26 of each light-reflective member 22 also slope laterally from left to right in FIG. 1.

Figure 3:
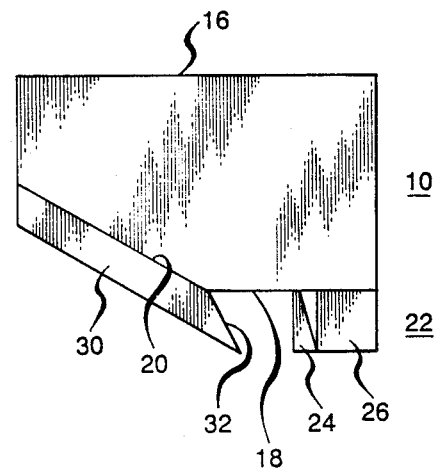
FIG. 3 is an end view of the light source of FIG. 1

Referring to FIGS. 1 and 3, mounted to the slope bottom surface 20 of the body 16 is a bar 30 which has a polished, light-reflective side 32 facing the light-reflecting bodies 22. The side 32 is not orthogonal to the top and bottom surfaces of the bar 30, but rather, slopes at a downwardly inclined angle, typically between 55° and 75°. Like the light-reflective members 22 and their integral brackets 24, the bar 30 is typically fabricated from brass plated with chrome or nickel.

Referring to FIG. 1, extending into the body 16 is a fiber optic bundle containing a plurality of individual fibers 36. Some of the fibers 36 in the bundle 34 each have a first end exposed through an opening (not shown) in the surface 18 opposite the vertex 28 on a separate one of the light-reflective bodies 22. Others of the fibers 36 each have a first end exposed through an elongated opening (not shown) in the surface 18 which runs parallel with, but opposite to, the side 32 on the bar 30. The fibers 36 each have a second end, distant from the body 16, into which light is directed from an electric lamp 40. In practice, the fibers are arranged such that about 60% carry light from the lamp 38 to the light-reflective bodies 22 while about 40% carry light to the light-reflective side 32 of the bar 30. Those fibers 36 which carry light to the light-reflective side 32 of the bar 30 are uniformly spaced therealong so that light is evenly directed at the light-reflective side.

Figure 2:
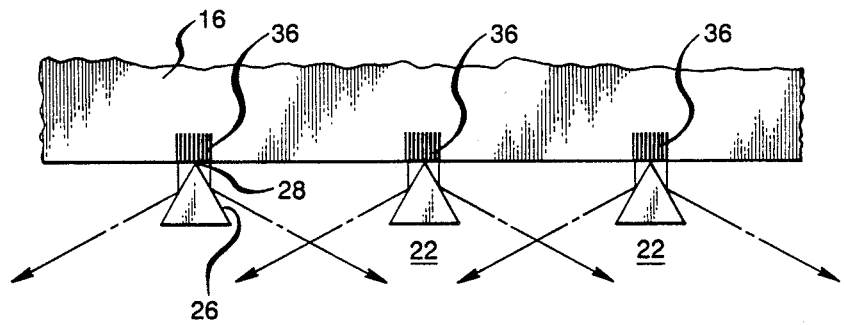
FIG. 2 is a front view in elevation of a portion of the light source of FIG. 1.

Referring to FIGS. 1 and 2, the light directed at the vertex 28 of each light-reflecting member 22 is split into two light beams 40, each reflected by a separate one of the two downwardly sloping sides 26 of the member towards the strip 12 (see FIG. 1) at a grazing angle with the surface 13 of FIG. 1. The two beams 40 diverge from each light-reflective body 22 a sufficient amount so each beam overlaps slightly with one of the beams reflected from an adjacent light-reflective body. As can best be seen in FIG. 1, the beams 40 tend to strike the surface in a direction generally along the axis 17.

Referring to FIG. 1, the light directed at the light-reflective side 32 of the bar 30 is reflected from it in a series of beams 42 directed at the strip 12 at a grazing angle with the surface 13. As may be appreciated from this figure, the beams 42 strike the surface 13 in a direction generally perpendicular to the axis 17. By illuminating the strip 12 with both beams 40 and 42 which run along, and perpendicular with, respectively, the axis 17, the strip 12 can be homogeneously illuminated with side light.

An important advantage of the illumination source 10 is its ability to illuminate the strip 12 without the need to be directly above it. As described above, the two downwardly sloping sides 26 of each light-reflective member 22 also slope laterally, from left to right in FIG. 1. The lateral slope of each of downwardly sloping side 26 assures that the beam 40 reflected by the side will strike the strip 12 even when the body 16 is positioned as much as a few centimeters laterally from the strip. In this way, the strip 12 may be imaged, without any interference from the illumination source 10, by a linescan camera (not shown) positioned above the strip. When the strip 12 is to be imaged by a linescan camera, it is useful to position a second illumination source (not shown), identical to the source 10, adjacent to the opposite side of the strip.

It is to be understood that the above-described embodiments are merely illustrative of the principles of the invention. Various modifications and changes may be made thereto by those skilled in the art which will embody the principles of the invention and fall within the spirit and scope thereof.

I claim:

1. A method for illuminating at least a portion of a major surface of a substrate with light directed at the substrate at a grazing angle, comprising the steps of:
   directing light at each of a plurality of first light-reflective bodies arranged above the substrate in spaced relationship along a first axis running along the surface of the substrate;
   splitting the light striking each first light-reflective member into a pair of beams;
   reflecting, from each first light-reflective member, each of the pair of beams onto the surface of the substrate in opposite directions generally along the first axis such that each beam strikes the surface of the substrate at a grazing angle and overlaps at least a portion of one of the two beams reflected from an adjacent light-reflective member; and
   directing light towards the substrate in a direction generally perpendicular to the first axis such that the light strikes the substrate at a grazing angle.

2. The method according to claim 1 wherein the step of directing light at each of the first light-reflective members comprises the step of carrying light to each member from an electric lamp through a lightguide fiber.

3. A method of imaging a substrate comprising the steps of:
   illuminating at least a thin strip of area running across the substrate by directing the substrate surface at a grazing angle; and
   capturing the image of the thin strip of area with a linescan camera, the improvement comprising illuminating the thin strip of area by the steps of:
   directing light at each of a plurality of first light-reflective members arranged above the substrate in spaced relationship along the longitudinal axis of the strip of area to be illuminated;
   splitting the light striking each light-reflective member into a pair of beams;
   reflecting, from each first light-reflective member, each of the pair of beams towards the strip of area, in opposite directions generally along the longitudinal axis of the strip, such that each beam strikes the strip at a grazing angle relative to the substrate and overlaps at least a portion of one of the two beams reflected from an adjacent light-reflective member; and
   directing light towards the strip of area in a direction generally perpendicular to the first axis such that the reflected light strikes the strip at a grazing angle relative to the substrate.

4. The method according to claim 3 wherein the step of directing light at each of the first light-reflective members comprises the step of carrying light to each member from an electric lamp through a lightguide fiber.

5. Apparatus for illuminating at least a portion of a major surface of a substrate with light directed at the substrate at a grazing angle, comprising:
   an elongated body spaced above the substrate so as to be parallel to an axis running along its surface;
   a plurality of first light-reflective members depending from the body in spaced relation along the axis, each member shaped to split a beam of light directed thereat into two beams and to reflect each of the two, in a downward direction opposite the other beam, so each beam strikes the substrate at a grazing angle in a direction generally along the first axis;
   means for directing light at each of the first light-reflective bodies; and
   means for directing light towards the substrate at a grazing angle in a direction generally perpendicular to the first axis so the light strikes the substrate at a grazing angle.

6. The apparatus according to claim 5 wherein each of the first light-reflective members comprises a three sided, metal prism reflector secured by an integral bracket to the body such that the reflector has a vertex adjacent to the body so that light directed at the vertex is split into two beams and is reflected from each of a pair of the sides of the reflector which slope downwardly towards the surface of the substrate.

7. The apparatus according to claim 5 wherein the means for directing light at each of the first light-reflective members comprises at least one lightguide fiber.

* * * * *